(12) United States Patent
Jansen et al.

(10) Patent No.: US 8,390,320 B2
(45) Date of Patent: Mar. 5, 2013

(54) DYNAMIC PAD HARDWARE CONTROL

(75) Inventors: Andreas Jansen, Murnau (DE); Andreas Geiler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/044,758

(22) Filed: Mar. 10, 2011

(65) Prior Publication Data
US 2012/0229163 A1  Sep. 13, 2012

(51) Int. Cl.
*H03K 19/173* (2006.01)
(52) U.S. Cl. ........................................ 326/38
(58) Field of Classification Search .................. None
See application file for complete search history.

(56) References Cited

U.S. PATENT DOCUMENTS

| | | | |
|---|---|---|---|
| 6,509,757 B1* | 1/2003 | Humphrey | 326/30 |
| 6,870,397 B1* | 3/2005 | Fox et al. | 326/41 |
| 7,853,842 B2* | 12/2010 | Kim et al. | 714/721 |
| 2008/0142352 A1* | 6/2008 | Wright | 200/600 |

* cited by examiner

*Primary Examiner* — Crystal L Hammond
(74) *Attorney, Agent, or Firm* — Eschweiler & Associates, LLC

(57) ABSTRACT

Some embodiments of the present disclosure relate to dynamic hardware pad control that is triggered by an intelligent hardware module that monitors an operational state of an IC pin. This hardware module then provides a control signal, which is based on the operational state of the IC pin, to a multiplexer control block that selects one of several different configurations for the IC pin. Because the control signal is provided by the hardware module, the techniques disclosed herein allow precise switching between a number of different IC pin configurations in a fast and efficient manner.

26 Claims, 3 Drawing Sheets

DYNAMIC PAD HARDWARE CONTROL

BACKGROUND

Integrated circuits (IC), which may also be referred to in some contexts as microchips, typically include a number of semiconductor devices formed thereon. For example, ICs often include transistors, and can also include resistors, capacitors, inductors, and even Micro Electrical-Mechanical devices (MEMs), among other types of devices. In order to allow external (i.e., off-chip) components to electrically connect to the on-chip devices, ICs include pins.

During operation, an IC pin can be set to any one of a number different configurations at any given time. For example, a single I/O pin can be set as an input pin at one time (during which a device on the IC transmits an output current or voltage to the pin) and can be set as an output pin at another time (during which a device on the IC receives an incoming current or voltage from the pin). In conventional approaches, software is used to select a configuration for the pin. For some applications, however, it would be beneficial to adjust the configuration of the pin according to an asynchronous event or to an analog threshold. Accordingly, the present disclosure proposes techniques for reconfiguring an I/O pin based on hardware detected event, which allows faster and more accurate reconfigurations for a pin.

DETAILED DESCRIPTION

Figure 1:
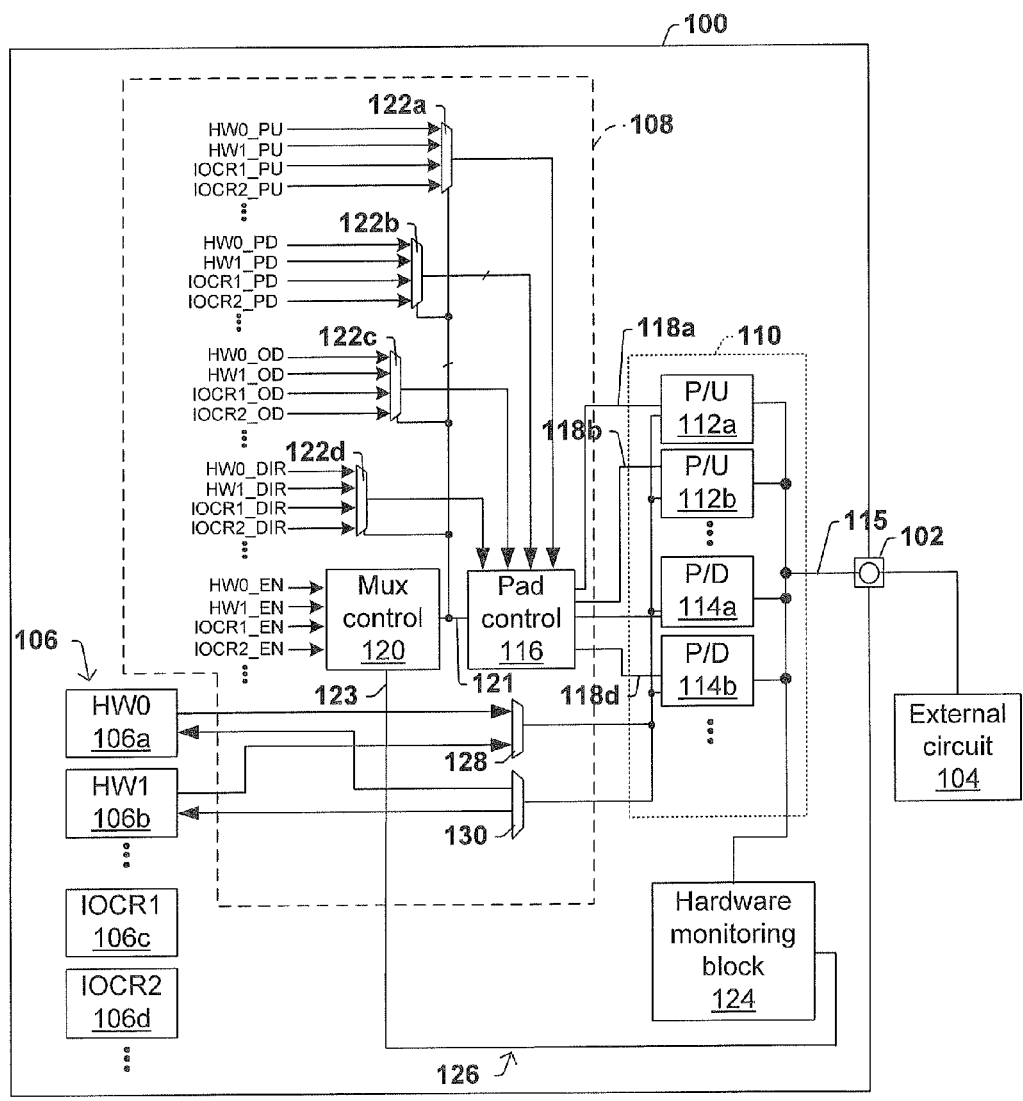
FIG. 1 is a block diagram illustrating an integrated circuit in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Some embodiments of the present disclosure relate to dynamic hardware pad control that is triggered by an intelligent hardware block that monitors an operational state of an IC pin. In many embodiments, the hardware block provides a control signal, which is based on the operational state of the IC pin, to a multiplexer control block that selects one of several different configurations for the IC pin. Because the control signal is provided by the hardware block, the techniques disclosed herein allow precise switching between a number of different IC pin configurations in a fast and efficient manner.

FIG. 1 shows an integrated circuit 100 that uses dynamic pad hardware control. The integrated circuit 100 includes an external IC pin 102 configured to be coupled to an external circuit 104. A number of hardware peripheral blocks 106 (e.g., HW0 106a, HW1 106b) are coupled to the pin 102 through a port slice block 108 and pad 110. Because of this configuration, the pin 102 is shared by the peripheral blocks 106, such that typically only one peripheral block carries out an input or output function via the pin 102 at a given time.

To facilitate desired functionality, the pad 110 includes a number of pad devices that are coupled to the IC pin 102. Push-pull devices are one type of device that can be included. FIG. 1 shows a pad 110 that includes number of different pull-up (P/U) pad devices 112a, 112b, . . . , as well as number of different pull-down (P/D) pad devices 114a, 114b, . . . . Each pull-up device can include a p-type transistor having a source coupled to VDD and drain coupled to the pad output 115, while each pull-down device can include an n-type transistor having a source coupled to VSS and a drain coupled to the pad output 115. The pad devices 112a, 112b, . . . , 114a, 114b, . . . , are coupled to a pad controller 116 via respective control lines 118a, 118b, 118c, 118d, . . . . Under control of the pad controller 116, the pad devices can cooperatively establish a number of different operating states for the IC pin 102. For example, as more pull-up devices 112 are enabled, the integrated circuit 100 tends to source more current with respect to the pin 102 and external circuit 104; and as more pull-down devices 114 are enabled, the integrated circuit 100 tends to sink more current with respect to the pin 102 and external circuit 104.

To establish control between the peripherals 106 and pin 102, a multiplexer control block 120 has a number of inputs on which a respective number of enable signals are received (e.g., HW0_en, HW1_en, IOCR_en). At any given time, the multiplexer control block 120 selectively passes one of the enable signals through to its output 121 based on a control signal received on its control terminal 123. The pad controller 116 as well as a number of downstream multiplexers (122a, 122b, . . . ) subsequently receive the selected enable signal from output 121.

Each downstream multiplexer 122a-122d can specify a different combination of pad devices 110 to implement a corresponding operating condition for the pin 102. For example, a first downstream multiplexer 122a can control which pull-up devices (e.g., 112a, 112b), if any, are asserted; and a second downstream multiplexer 122b can control which pull-down devices (e.g., 114a, 114b), if any, are asserted. In particular, the HWx_xx signals are typically tied to the corresponding hardware peripheral. For example, the signals HW0_PD, HW0_PU, HW0_OD (overdrive), and HW0_DIR (direction) are tied to the HW0 peripheral module 106a; and the signals HW1_PD, HW1_PU, HW1_OD, and HW1_DIR are tied to the HW1 peripheral module 106b. The IOCRx_xx signals, on the other hand, are coupled to corresponding software programmable control registers (e.g., registers IOCR1 and IOCR2). These IOCR registers provide end users with flexible pin configurations, for example, to account for changes in operation desired after a particular part is fabricated.

Consider an example where hardware peripheral (HW0) 106a wants to transmit data over the pin 102. To start such a transmission, hardware peripheral HW0 106a asserts its enable signal (HW0_EN). Assuming the control terminal 123 is set appropriately, the HW0_EN signal is passed through to the multiplexer control output 121. This sets each of the downstream multiplexers 122a-122d to select the corresponding HW0 signals (HW0_PD, HW0_PU, HW0_OD, HW0_DIR), and also notifies the pad control 116 that HW0 is enabled. Hence, by virtue of the signals from the downstream multiplexers 122a-122d, the pad controller 116 knows whether the HW0 peripheral wants to transmit or receive (HW0_DIR) data and what pulse characteristics (e.g., current and voltage levels via HW0_PD, HW0_PU, HW0_OD) are required for transmission at any given time. HW0 can then transmit or receive data by using data multiplexers (128, 130) in coordinated fashion with the control signals provided to the pad devices 110.

To control which enable signal is selected from the multiplexer control block 120, a hardware block 124 is disposed on a control path 126 coupling the IC pin 102 and the multiplexer control block 120. The hardware block 124 is configured to monitor a present operating state of the IC pin 102 and provide a control signal to the control terminal 123 of the multiplexer control block 120 based thereon. In this way, the hardware block 124 can trigger the pin 102 to switch from one operating configuration to another operating condition in a fast and efficient manner.

Figure 2:
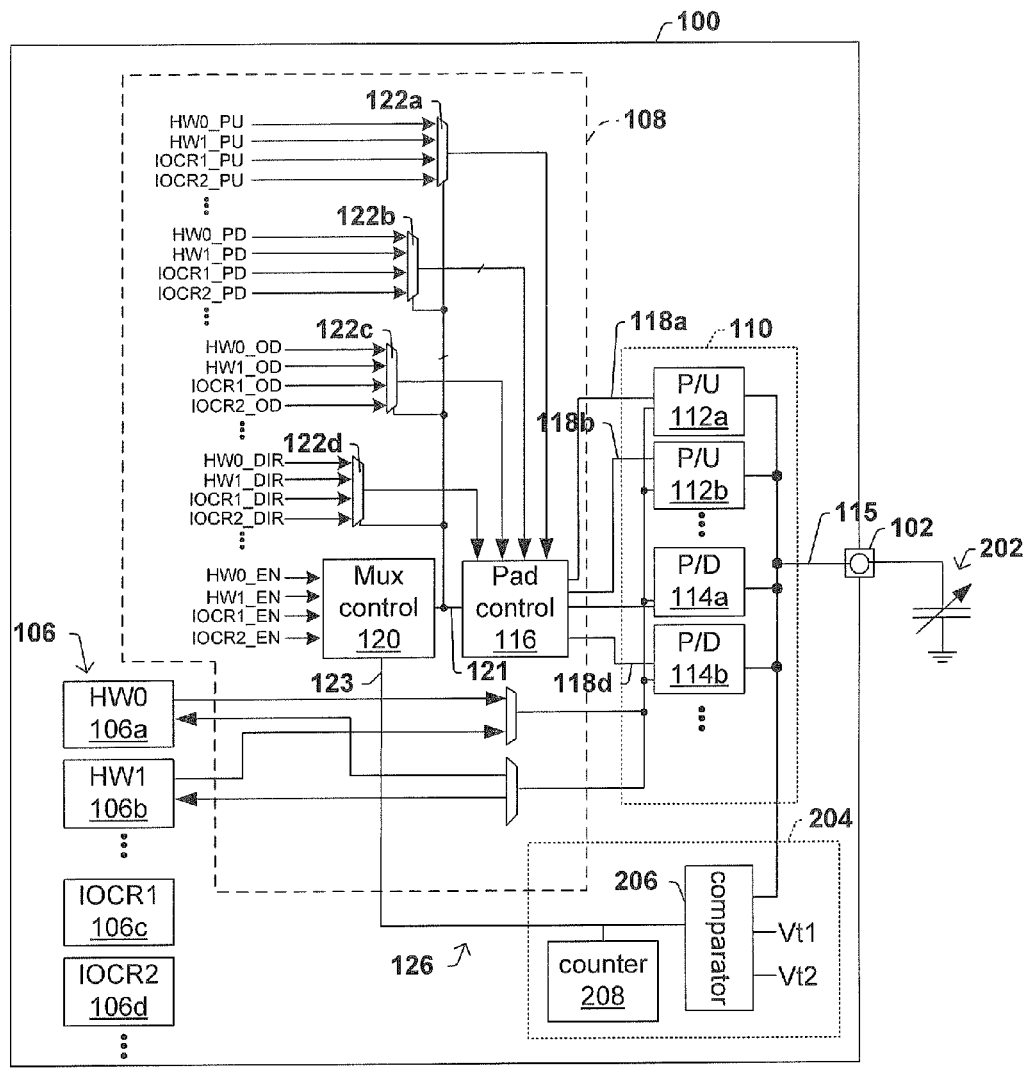
FIG. 2 is a block diagram illustrating an integrated circuit in accordance with some embodiments.
Figure 3:
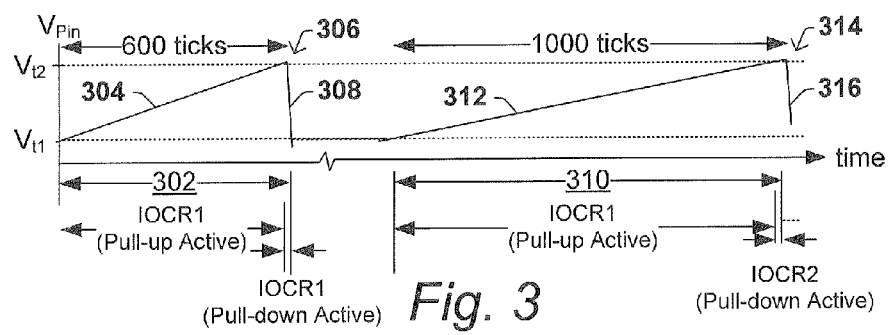
FIG. 3 shows an example of a series of waveforms consistent with one implementation of the integrated circuit of FIG. 2.

To describe a more concrete example of hardware pad dynamic control, this disclosure will now consider a touch pad example in the context of FIGS. 2-3.

In FIG. 2's example, the exterior circuit of FIG. 1 takes the form of a variable capacitor 202 representing a touch pad. The variable capacitor 202 is coupled to the IC pin 102, and a pair of control registers (IOCR1, IOCR2) store pin configuration settings, which control the pad devices and thereby control voltages and/or currents via the pin. The first control register (IOCR1) is programmed with pin settings corresponding to a weak pull-up condition, and the second control register (IOCR2) is programmed with pin settings corresponding to a strong pull-down condition. To control which IOCR is selected, the IC includes a hardware block 204 in the form of a comparator 206 with two thresholds ($V_{T1}$, $V_{T2}$) and a counter 208. As will be appreciated in more detail below, the hardware block 204 delivers an appropriate time-varying control signal to the control terminal of the multiplexer control block 120 to quickly and accurately reconfigure the pin 102 to interface appropriately with the touchpad 202.

A basic goal of FIG. 2's integrated circuit 200 is to determine whether an object (e.g., a person's finger) is moving on the touch pad, as evidenced by a change in capacitance as measured by the variable capacitor 202. When the object is on the touch pad, the capacitance of the variable capacitor 202 tends to be greater.

FIG. 3 shows one example of touchpad operation, and is discussed below with reference to FIG. 2. During a first portion of time 302, a user is touching a surface of the touch pad (hence providing a relatively small capacitance to be measured by the integrated circuit). During this time, the voltage on the pin 102 is greater than the first threshold $V_{T1}$ and less than the second threshold $V_{T2}$, causing the comparator 206 to output a first control state. This first control state sets the multiplexer control block 120 to pass the IOCR1_EN to its output. This correspondingly delivers the IOCR1 configuration bits (e.g., IOCR1_PU, IOCR1_PD, IOCR1_OD, IOCR1_DIR) from the downstream multiplexers 122a-122d to the pad controller 116. Because IOCR1 corresponds to a weak pull up condition (e.g., when only a small number of pull up devices are enabled), the pin 102 slowly pulls up the voltage on the variable capacitor 202 as indicated by ramp segment 304.

At time 306, the pin voltage exceeds the second threshold VT2, which causes the comparator to change the output state of the control signal. In response to the change in control signal state, the multiplexer control block 120 switches state to pass IOCR2_en through to its output. This correspondingly delivers the IOCR2 configuration bits (e.g., IOCR2_PU, IOCR2_PD, IOCR2_OD, IOCR2_DIR) from the downstream multiplexers 122a-122d to the pad controller 116. Because IOCR2 corresponds to a strong pull down condition (e.g., when only a large number of pull down devices are enabled), the result is that the pin voltage falls sharply during this time as shown by 308.

The counter counts continuously at a regular time interval so long as the pin voltage is between $V_{T1}$ and $V_{T2}$ to determine the length of the pulse. In this example, the pulse has a length of 600 ticks, which corresponds to a relatively small capacitance associated with a user touching the touch pad.

During a second portion of time 310, the user is no longer touching the surface of the touch pad (hence, the capacitance increases somewhat relative to time 302). During this time, the voltage on the pin 102 is again less than the first threshold $V_{T1}$, such that the IOCR1 configuration bits cause a weak pull up condition. However, because the capacitance has now increased, the pin voltage ramps up more slowly as shown by 312. At time 314, the pin voltage exceeds the second threshold $V_{T2}$, which causes the comparator to change the output state of the control signal to pass IOCR2_en through to its output. This correspondingly delivers the IOCR2 configuration bits (e.g., IOCR2_PU, IOCR2_PD, IOCR2_OD, IOCR2_DIR) from the downstream multiplexers 122a-122d to the pad controller 116. Because IOCR2 corresponds to a strong pull down condition (e.g., when only a large number of pull down devices are enabled), the result is that the pin voltage falls sharply during this time as shown by 316.

During the second time 310, the counter now counts a value of 1000, which corresponds to a relatively high capacitance associated with a user not touching the touch pad. Thus, by evaluating the value stored in the counter after pulses are complete, the system can determine the capacitance of the variable capacitor 202 and thereby infer whether the touch pad is in use (or not). It will be appreciated that the hardware block 204 can also include additional functionality. For example, in many embodiments, the hardware block 204 may take into account temperature, humidity, or even how "dirty" the touchpad surface is. The hardware block can then adjust its control signal to (e.g., to adjust the pull up devices or pull-down devices via additional IOCR control registers (not shown)) to account for these dynamic conditions.

Figure 4:
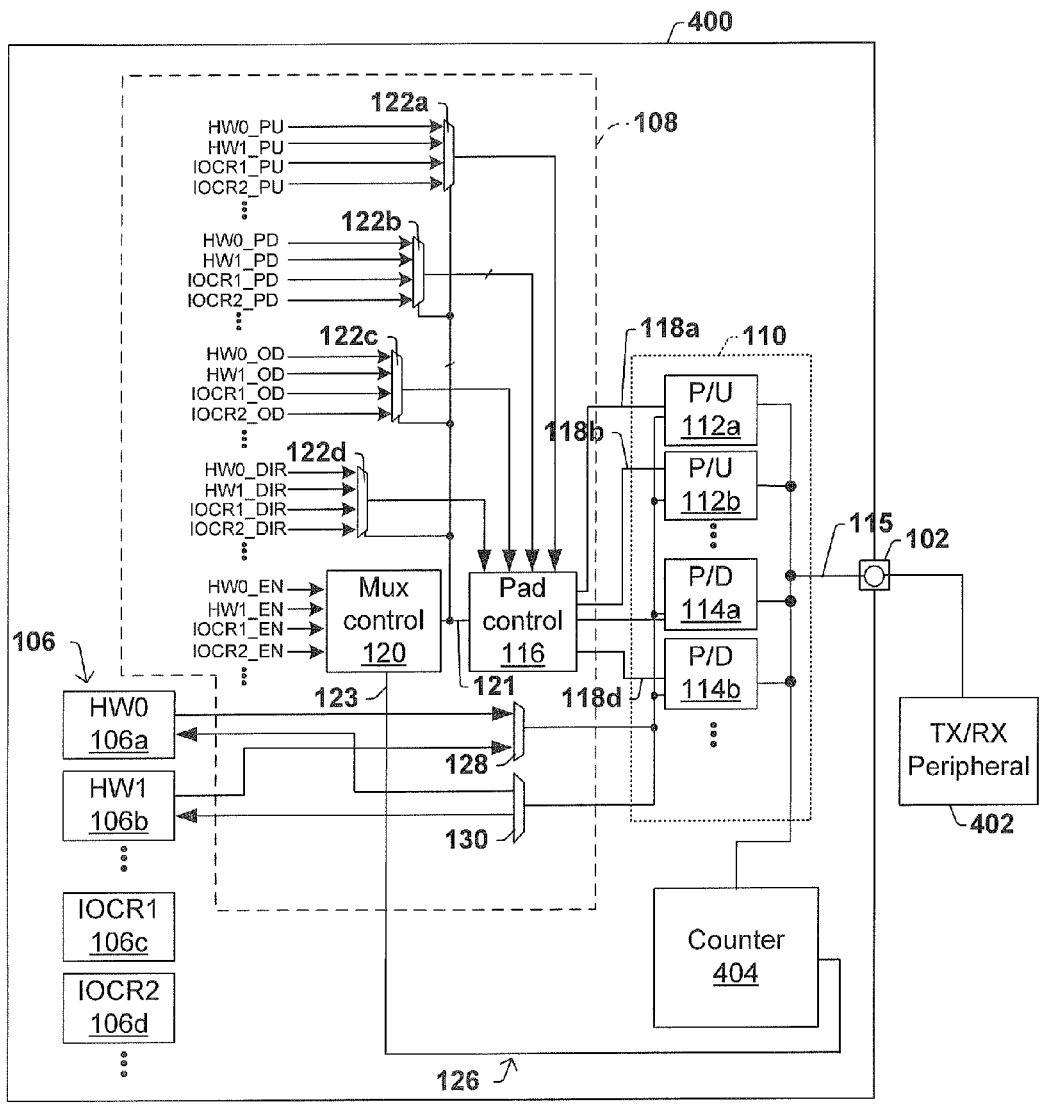
FIG. 4 is a block diagram illustrating an integrated circuit in accordance with some embodiments.

FIG. 4 shows another embodiment where an integrated circuit 400 interfaces to an external communication module 402, such as a serial communication module, for example. The external communication module 402 and IC can communicate, for example via an I2C protocol or similar. To facilitate communication, the IC includes an intelligent hardware block on a control path 126, wherein the hardware block comprises a timer 404.

In a serial protocol, the IC 400, when acting as a transmitter, can transmit an address pointer first, and then wait for an acknowledgement from an intended receiver. This address pointer is transmitted using a first configuration setting for the pad 110, which corresponds to a first combination of pad devices used to transmit the address pointer.

If the address pointer is received at an intended receiver, the intended receiver acknowledges receipt of the address pointer by sending an acknowledgement message back to the IC 400. The acknowledgment message is transmitted a predetermined number of cycles after the address pointer has been transmitted. For example, the acknowledgement can be received nine cycles after the address pointer has been transmitter.

Hence, when the IC 400 transmits the address pointer, the counter 404 starts to count bus cycles on the pin 102. When the predetermined number of cycles elapses (e.g., when 9 cycles elapses and an acknowledgement is expected), the counter 404 automatically switches the state of the control signal on 123 to put the pin 102 in an appropriate operating state to receive the acknowledgement. For example, if several push-type devices 112 were used to transmit the address pointer, several pull-type devices can be used to receive the acknowledgement. As the time for the address pointer transmission is predictable, the timer 404 can be programmed and started synchronously with the transmit event. The timer can generate the trigger event for the dynamic port hardware re-configuration to input. With this a simple serial module plus a standard timer can handle a serial protocol without software interaction.

Although the disclosure has been shown and described with respect to one or more implementations, equivalent alterations and modifications will occur to others skilled in the art based upon a reading and understanding of this specification and the annexed drawings. For example, although the disclosure has been described above with respect to a touch pad device and a communications device, the disclosure is also applicable to other electronics devices. Further, although the above described embodiments have been illustrated and described with regards to control registers (e.g., IOCR1, IOCR2), it will be appreciated that a register as contemplated herein is not limited to flip-flops or other latch-type devices. Thus, in some embodiments, a control register can be a random access memory (RAM), flash memory, read only memory (ROM), or any other memory cell. A control register could be hardcoded as well. Whatever the case, a control register as described in this disclosure allows a multiplexer to selectively provide different operating conditions for an IC pin based on a hardware and/or software control signal.

The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. An integrated circuit (IC) having an IC pin, comprising:
a pad comprising a plurality of plurality of active pull-up devices and a plurality of active pull-down devices that are coupled to the IC pin, wherein the plurality of pull-up and pull-down devices are operable to establish a plurality of different operating states for the IC pin;
a pad controller comprising a plurality of control lines coupled to the plurality of pull-up and pull down devices, respectively; and
a hardware block configured to analyze a present operating state of the IC pin and provide a control signal to switch between different combinations of enabled pull-up devices or different combinations of enabled pull-down devices to set a current or voltage level for the IC pin to a plurality of different corresponding current or voltage levels based on the operating state of the IC pin.

2. The IC of claim 1, wherein the IC further comprises:
a first multi-bit, programmable control register to store a first multi-bit configuration setting, wherein the first multi-bit configuration setting specifies how the plurality of pull-up and pull-down devices are to be configured to achieve a first predetermined operating state for the IC pin.

3. The IC of claim 2, wherein the IC further comprises:
a second multi-bit, programmable control register to store a second multi-bit configuration setting, wherein the second multi-bit configuration setting specifies how the plurality of pull-up and pull-down devices are to be configured to achieve a second predetermined operating state for the IC pin.

4. The IC of claim 3, wherein the IC further comprises:
a multiplexer to selectively provide the first and second multi-bit configuration settings to the pad controller based on the present operating state of the IC pin.

5. The IC of claim 2, wherein the IC further comprises:
a hardware peripheral block configured to carry out a predetermined communication protocol with an exterior circuit while employing a third configuration setting, wherein the third configuration setting specifies how the plurality of devices are to be configured during at least part of the predetermined communication protocol.

6. The IC of claim 5, wherein the IC further comprises:
a multiplexer to selectively provide the first and third configuration settings to the pad controller based on the present operating state of the IC pin.

7. The IC of claim 1, wherein the plurality of the devices on the pad include a pull-up device for outputting a voltage to the IC pin and a pull-down device for receiving a voltage on the IC pin.

8. The IC of claim 1, wherein the hardware block comprises a variable capacitor.

9. The IC of claim 8, wherein the variable capacitor is associated with a touchpad.

10. The IC of claim 1, wherein the hardware block comprises a timer.

11. The IC of claim 1, wherein the plurality of active pull-up devices comprise at least two pull-up devices and wherein the control signal switches between at least three different current or voltage levels for the IC pin by selectively enabling the individual pull-up devices.

12. The IC of claim 1, wherein the plurality of active pull-down devices comprise at least two pull-down devices and wherein the control signal switches between at least three different current or voltage levels for the IC pin by selectively enabling the individual pull-down devices.

13. An integrated circuit (IC) having an IC pin, comprising:
a pad comprising a plurality of devices that are coupled to the IC pin, wherein the plurality of devices are operable to establish a plurality of different operating states for the IC pin;
a pad controller comprising a plurality of control lines coupled to the plurality of devices, respectively;
a multiplexer comprising: a multiplexer output coupled to the pad controller and a plurality of multiplexer inputs coupled to a plurality of multi-bit control registers, respectively; wherein the multiplexer is configured to selectively deliver a selected multi-bit multiplexer input to the pad controller based on a control signal provided on a control terminal of the multiplexer; and a hardware block configured to analyze a present operating state of the IC pin and provide the control signal to the control terminal of the multiplexer based on the present operating state.

14. The IC of claim 13, wherein the plurality of the devices on the pad include a pull-up device for outputting a voltage to the IC pin and a pull-down device for receiving a voltage on the IC pin.

15. The IC of claim 13, wherein the hardware block comprises a variable capacitor.

16. The IC of claim 15, wherein the variable capacitor is associated with a touchpad.

17. IC of claim 13, wherein the hardware block comprises a timer.

18. The IC of claim 13, wherein the hardware block includes a comparator that compares a voltage of the IC pin to first and second threshold levels, and selectively alters a state of the control signal based thereon.

19. The IC of claim 18, wherein the IC further comprises:
a counter configured to increment a count value based on whether the operating state of the IC pin has a first predetermined relationship with the first and second threshold values and configured to stop incrementing based on whether the operating state of the IC pin has a second predetermined relationship with the first and second threshold values.

20. The IC of claim 19, wherein the count value when incrementing is stopped is indicative of whether an object has been present on a touch pad coupled to the IC pin while the count value was being incremented.

21. The IC of claim 13, wherein a least one of the plurality of control registers is a multi-bit register that is programmable via software.

22. The IC of claim 13, wherein the IC further comprises:
a hardware peripheral block configured to carry out a predetermined communication protocol with an exterior circuit while employing a third configuration setting, wherein the third configuration setting specifies how the plurality of devices are to be configured during at least part of the predetermined communication protocol.

23. The IC of claim 22, wherein the multiplexer has a multiplexer input coupled to the hardware peripheral block and is configured to selectively pass signals from the hardware peripheral block to the pad controller based on the present operating state of the IC pin.

24. The IC of claim 22, wherein the predetermined communication protocol is a serial communication protocol.

25. The IC of claim 13, wherein the hardware block is further configured to provide a control signal to switch between different combinations of enabled pull-up devices and different combinations of enabled pull-down devices to set a current or voltage level for the IC pin to different corresponding current or voltage levels based on the operating state of the IC pin.

26. An integrated circuit (IC) having an IC pin, comprising:
a pad comprising a plurality of devices that are coupled to the IC pin, wherein the plurality of devices are operable to establish a plurality of different operating states for the IC pin;
a pad controller comprising a plurality of control lines coupled to the plurality of devices, respectively;
a hardware block configured to analyze a present operating state of the IC pin and provide a control signal to switch between different combinations of based on the operating state of the IC pin;
a first multi-bit, programmable control register to store a first multi-bit configuration setting, wherein the first multi-bit configuration setting specifies how the plurality of devices are to be configured to achieve a first predetermined operating state for the IC pin;
a second multi-bit, programmable control register to store a second multi-bit configuration setting, wherein the second multi-bit configuration setting specifies how the plurality of devices are to be configured to achieve a second predetermined operating state for the IC pin; and
a multiplexer to selectively provide the first and second multi-bit configuration settings to the pad controller based on the present operating state of the IC pin.

* * * * *